US008830988B2

(12) United States Patent
Hasan et al.

(10) Patent No.: US 8,830,988 B2
(45) Date of Patent: Sep. 9, 2014

(54) COLLECTING NETWORK PERFORMANCE DATA FROM MULTIPLE AUTONOMOUS SYSTEMS

(75) Inventors: Masum Hasan, Cupertino, CA (US); Monique Morrow, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 13/571,859

(22) Filed: Aug. 10, 2012

(65) Prior Publication Data

US 2012/0300780 A1 Nov. 29, 2012

Related U.S. Application Data

(63) Continuation of application No. 11/953,485, filed on Dec. 10, 2007, now Pat. No. 8,265,074.

(51) Int. Cl.
*H04L 12/28* (2006.01)
*H04L 12/24* (2006.01)
*H04L 12/751* (2013.01)
*H04L 12/715* (2013.01)
*H04L 29/12* (2006.01)

(52) U.S. Cl.
CPC ............ *H04L 45/04* (2013.01); *H04L 61/1541* (2013.01); *H04L 41/5009* (2013.01); *H04L 45/02* (2013.01); *H04L 29/12113* (2013.01)
USPC ........................................................ 370/351

(58) Field of Classification Search
CPC ...................................................... H04L 12/56
USPC .......................................................... 370/351
See application file for complete search history.

(56) References Cited

U.S. PATENT DOCUMENTS

| 7,139,242 | B2 * | 11/2006 | Bays | 370/238 |
| 7,260,645 | B2 * | 8/2007 | Bays | 709/238 |
| 8,023,421 | B2 * | 9/2011 | Lloyd et al. | 370/252 |
| 2006/0239201 | A1 * | 10/2006 | Metzger et al. | 370/252 |
| 2007/0047446 | A1 * | 3/2007 | Dalal et al. | 370/237 |
| 2008/0151761 | A1 | 6/2008 | Theisen | |
| 2012/0300780 | A1 * | 11/2012 | Hasan et al. | 370/392 |

OTHER PUBLICATIONS

Rekhter, Y., et al., RFC1771—A Border Gateway Protocol 4 (BGP-4), Standards Track. Published by Network Working Group [online] Mar. 1995. [retrieved on Sep. 17, 2008]. pp. 1-45. Retrieved from the Internet <URL: http://www.faqs.org/rfcs/rfc1771.html>.

Welcher, Peter J., Configuring Cisco Optimized Edge Routing. Published by Chesapeake Netcraftsmen [online] Feb. 2006. [retrieved on Sep. 15, 2008]. pp. 1-6. Retrieved from the Internet: <URL: http://www.netcraftsmen.net/welcher/papers/oer02.html>.

* cited by examiner

*Primary Examiner* — Guang Li
(74) *Attorney, Agent, or Firm* — Hickman Palermo Truong Becker Bingham Wong LLP

(57) ABSTRACT

A computer apparatus comprises first Border Gateway Protocol (BGP) logic comprising BGP route table data; a network interface to communicatively couple to a first autonomous system; data collection logic in computer-readable storage media when executed operable to perform discovering an address prefix of a data collector that is communicatively coupled to second BGP logic of a router within a second autonomous system that is coupled to the first autonomous system, wherein the second autonomous system is independent of the first autonomous system; determining a path through the first autonomous system, the one or more networks or internetworks, and the second autonomous system to the data collector based on the BGP route table; requesting the data collector to provide one or more data values relating to performance of network elements of the second autonomous system; receiving and storing the one or more data values.

15 Claims, 7 Drawing Sheets

COLLECTING NETWORK PERFORMANCE DATA FROM MULTIPLE AUTONOMOUS SYSTEMS

BENEFIT CLAIM

This application claims the benefit under 35 U.S.C. §120 as a Continuation of application Ser. No. 11/953,485, filed Dec. 10, 2007, now U.S. Pat. No. 8,265,074 the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

CROSS-REFERENCE TO RELATED APPLICATIONS

Not applicable.

COPYRIGHT NOTICE

A portion of this patent disclosure contains material that is subject to copyright protection. The copyright owner has no objection to the reproduction of this patent document as it appears in the records of the U.S. Patent & Trademark Office, but reserves all other rights whatsoever. Copyright 2007 Cisco Systems, Inc.

TECHNICAL FIELD

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network service providers need techniques for providing end-to-end quality of service (QoS) assurance to customers for traffic that transits multi-domain networks. Multi-domain networks are networks that span multiple autonomous systems or multiple service providers. QoS assurance data is generally useful for verification in comparison to metrics that are specified in a Service Level Agreement (SLA). For proper verification, end-to-end (E2E) measurement of QoS at each segment of the multi-domain network from a source to a destination is desired. For example, a particular enterprise may use Internet service that spans multiple different service providers or multiple different autonomous systems of one service provider and the enterprise desires to have assurance that all the service providers or autonomous systems are complying with an SLA that the enterprise has entered into. To achieve this, given a destination IP prefix (such as 128.0.0.0/8), network service providers desire to collect performance data from a source network node to a destination node, collecting data at each network segment towards the destination.

However, providing such end-to-end data collection has been a challenge for several reasons. First, the networks involved in the collection path belong to multiple autonomous systems (AS) and are not owned or operated by the same entity. Second, a source collector may need to discover all the intermediate collectors towards the destination, or at least, know about the next hop to which the collection request can be forwarded, but this information is not readily available when the intermediate collectors are in another autonomous system. Finally, using a centralized scheme may not be feasible and desirable. Typically, measurement and collection use centralized network management systems.

Optimized Exit Routing, commercially available from Cisco Systems, Inc., San Jose, Calif., enables a router having multiple exit points to one or more different SPs to select an optimized exit point. However, OER is not distributed. OER is hosted in the customer premises rather than within a service provider network. OER cannot provide end-to-end performance collection or data measurement, and OER only collects data related to BGP traffic, but not all performance metrics in which a service provider may be interested.

DETAILED DESCRIPTION

Figure 1:
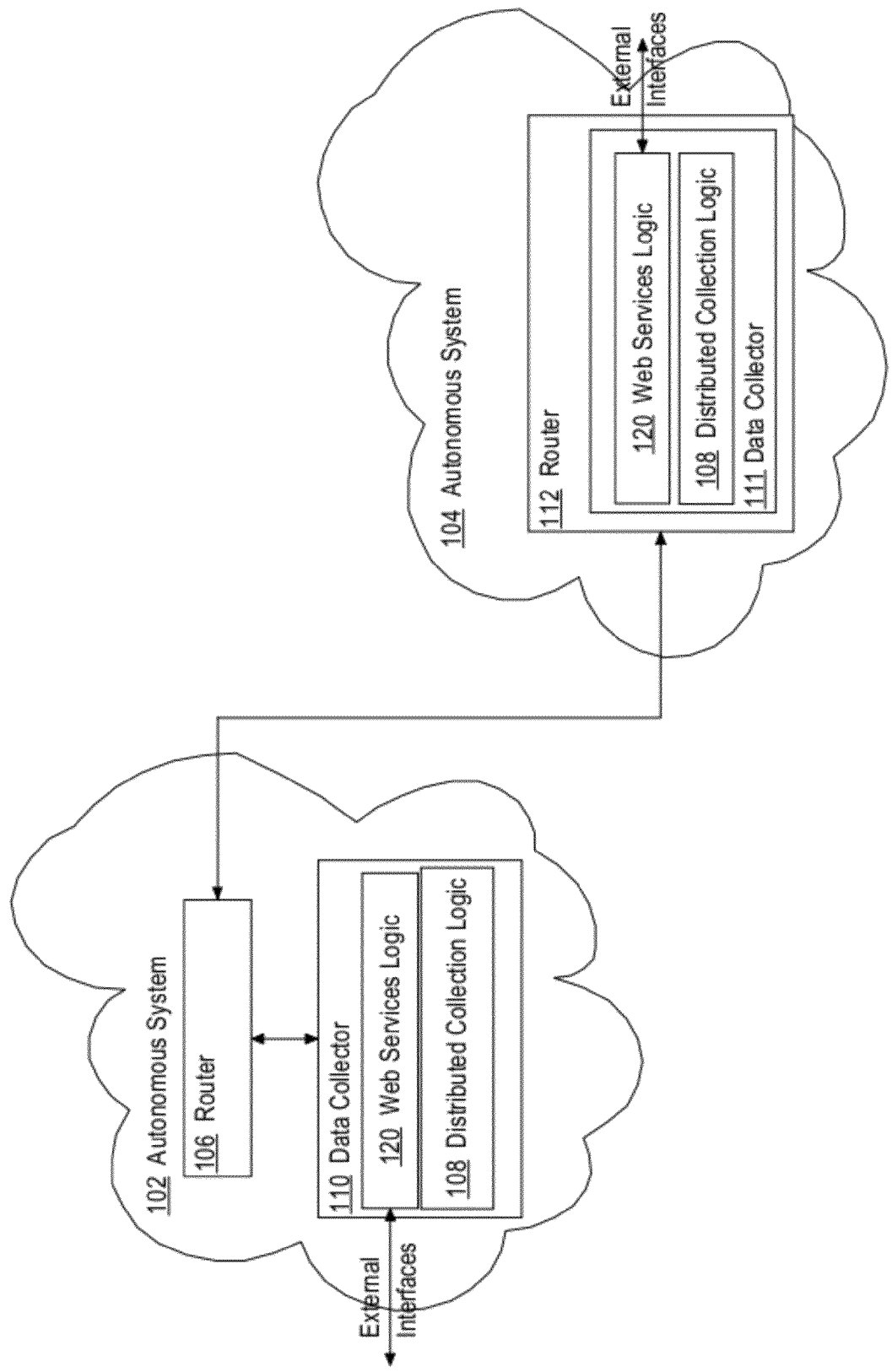
FIG. 1 illustrates autonomous systems having data collectors in one embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Detailed Example of Architecture, Protocol, and Operation
4.0 Implementation Mechanisms—Hardware Overview
5.0 Extensions and Alternatives
1.0 General Overview In an embodiment, a data processing system comprises a first data collector that is communicatively coupled to first Border Gateway Protocol (BGP) logic of a first router within a first autonomous system; a second data collector that is communicatively coupled to second BGP logic of a second router within a second autonomous system that is coupled to the first autonomous system directly or indirectly through one or more networks or internetworks; the second autonomous system is independent of the first autonomous system; the first data collector comprises logic encoded in one or more computer-readable storage media for execution and when executed operable to perform discovering an address prefix of the second data collector; determining a path through the first autonomous system, the one or more networks or internetworks, and the second autonomous system to the second data collector based on BGP route table data that the first BGP logic manages; requesting the second data collector to provide one or more data values relating to performance of network elements of the second autonomous system; receiving and storing the one or more data values.

In an embodiment, a computer apparatus comprises first Border Gateway Protocol (BGP) logic comprising BGP route table data; a network interface to communicatively couple to a first autonomous system; data collection logic in computer-readable storage media when executed operable to perform discovering an address prefix of a data collector that is communicatively coupled to second BGP logic of a router within a second autonomous system that is coupled to the first autonomous system, the second autonomous system is independent of the first autonomous system; determining a path through the first autonomous system, the one or more networks or internetworks, and the second autonomous system to the data collector based on the BGP route table; requesting the data collector to provide one or more data values relating to performance of network elements of the second autonomous system; receiving and storing the one or more data values.

In an embodiment, the data collection logic further comprises logic which when executed causes performing sending a request message to the data collector, the request message specifies one or more of: performance metrics, a collection data size for triggering a data response message, a data collection time interval for triggering the data response message, or a number of next collector hops up to which collection shall proceed.

In an embodiment, the data collection logic further comprises logic which when executed causes receiving a request message from the data collector, the request message specifies a number of next collector hops up to which collection shall proceed, the number is greater than 1; decrementing the number of next collector hops by 1; sending the request message to a second data collector, the request message specifies the decremented number of next collector hops; receiving from the second data collector, one or more second data values relating to performance of other network elements associated with the second data collector; receiving and storing the second one or more data values.

In an embodiment, the data collection logic further comprises logic which when executed causes receiving a request message from the data collector; determining, based on local policy of the apparatus that not all the performance metrics are supported; sending a response message to the data collector identifying a sub-set of the performance metrics that the apparatus supports.

In an embodiment, the apparatus further comprises Web Services logic, the data collector further comprises Web Services logic, and the path comprises a set of Web Services addresses of collectors in the autonomous systems. In an embodiment, the data collection logic further comprises logic which when executed causes creating and storing a mapping of autonomous system identifier values, which uniquely identify the first autonomous system and the second autonomous system, to Web Services addresses of collectors within the autonomous systems.

In an embodiment, the data collection logic further comprises logic which when executed causes retrieving one or more performance data values from each of one or more local border routers within the first autonomous system. In an embodiment, the apparatus further comprises logic which when executed causes requesting the first BGP logic to distribute a network address of the apparatus to the data collector in a BGP Path attribute of a BGP UPDATE message.

In an embodiment, the network address is a Web Services address of the apparatus. In an embodiment, the BGP Path attribute is any of an Optional Transitive or Optional Non-transitive BGP Path attribute.

In an embodiment, the apparatus further comprises logic which when executed causes sending to the data collector a collector address update message, and the update message comprises an address prefix and a set of one or more collector addresses that identify a path from the apparatus to the address prefix through the autonomous systems.

In an embodiment, the collector address update message is carried in a BGP Update message from the first BGP logic to the second BGP logic. In an embodiment, the collector addresses comprise Web Services addresses.

In other embodiments, the invention encompasses a computer apparatus and a computer-readable medium configured to carry out the foregoing steps.

2.0 Structural and Functional Overview

FIG. 1 illustrates autonomous systems 102, 104 having data collectors according to one embodiment. A first autonomous system 102 comprises a router 106 that is coupled to a data collector 110 that is configured with distributed collection logic 108 and web services logic 120. The data collector 110 and router 106 may reside in the same LAN, or in different network segments that are coupled to one another within autonomous system 102. Alternatively, a router may host data collector logic within the router. For example, router 112 of a second autonomous system 104 of FIG. 1 comprises or hosts data collector 111 having distributed collection logic 108 and web services logic 120. Thus, various embodiments may deploy data collectors in different ways and embodiments are not limited to hosting data collectors within routers. Each autonomous system 102, 104 of FIG. 1 comprises one or more network elements within a defined domain that a particular entity owns, operates or manages. A network service provider can own or operate multiple autonomous systems.

Router 106 in FIG. 1 broadly represents any element of network infrastructure that is configured to switch or forward data packets according to a routing protocol or switching protocol and may comprise a switch, bridge, hub, gateway, etc. For purposes of illustrating a clear example, autonomous system 102 is shown with one router 106, but in an actual implementation an autonomous system normally comprises numerous routers, switches, and other elements. The autonomous system 102 may be associated with a service provider.

Distributed collection logic 108 includes logic that can access and use other logic of a router or of the data collector that implements Border Gateway Protocol, such as BGPv4 as defined in Request for Comments (RFC) 1771 of the Internet Engineering Task Force (IETF). Various embodiments may implement other versions of BGP and the use of BGPv4 is not required. The BGP logic of a router is used by the data collectors to collect BGP AS path information from BGP tables of border routers of an AS, to construct paths to prefixes. Constructing such paths enables a Collect request, described further herein, from a remote collector or router to be routed to the specified prefix via the intermediate collectors.

Figure 3:
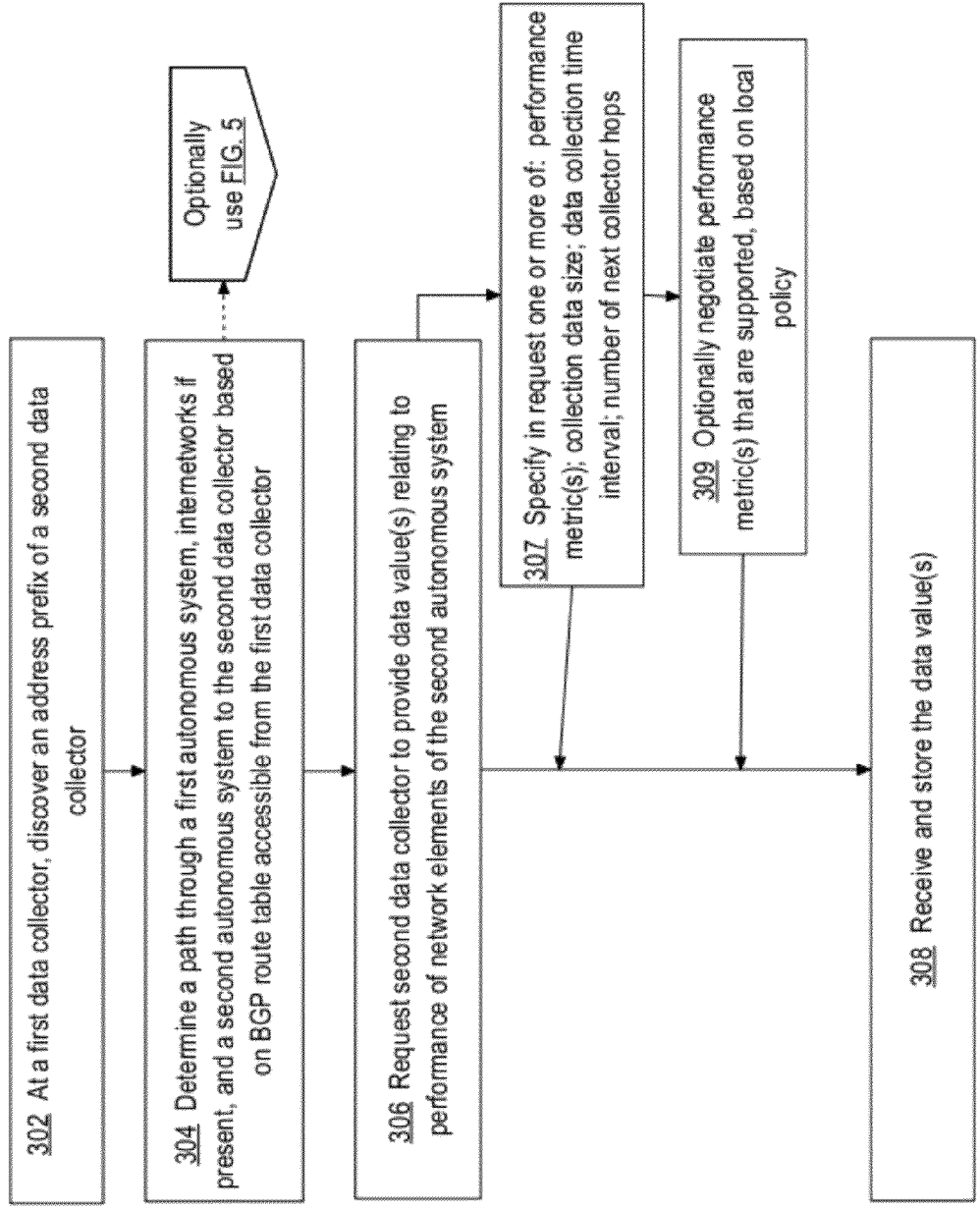
FIG. 3 illustrates a process of end-to-end data collection across multiple autonomous systems.
Figure 4:
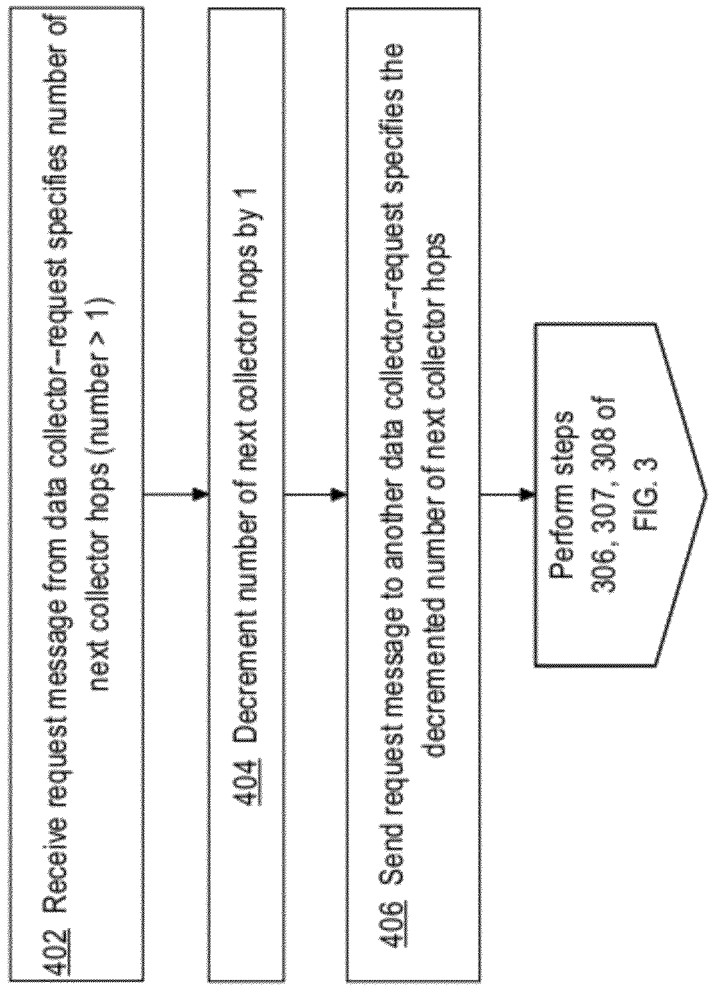
FIG. 4 illustrates processing in response to receiving a data collection message.

Data collectors 110, 111 comprise one or more computer programs, other software elements, or other logic configured to implement the data processing functions that are described in further detail herein in connection with FIG. 3, FIG. 4. Data collectors 110, 111 also may implement the functions of FIG.

Figure 6:
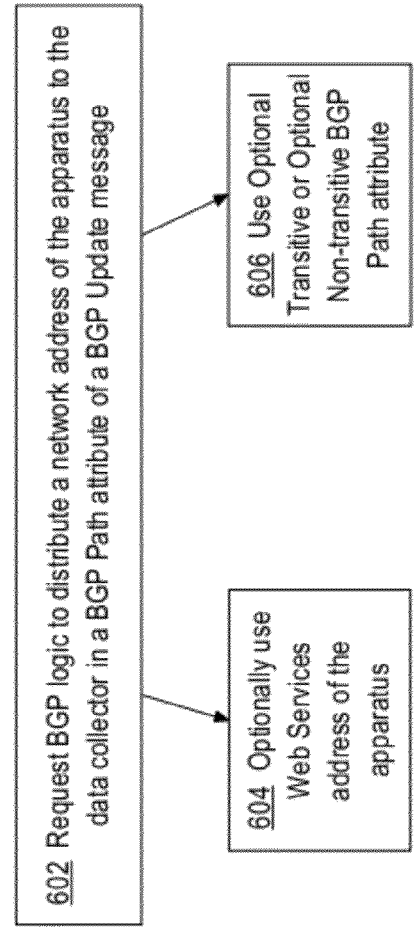
FIG. 6 illustrates distributing network addresses of data collectors.
Figure 7:
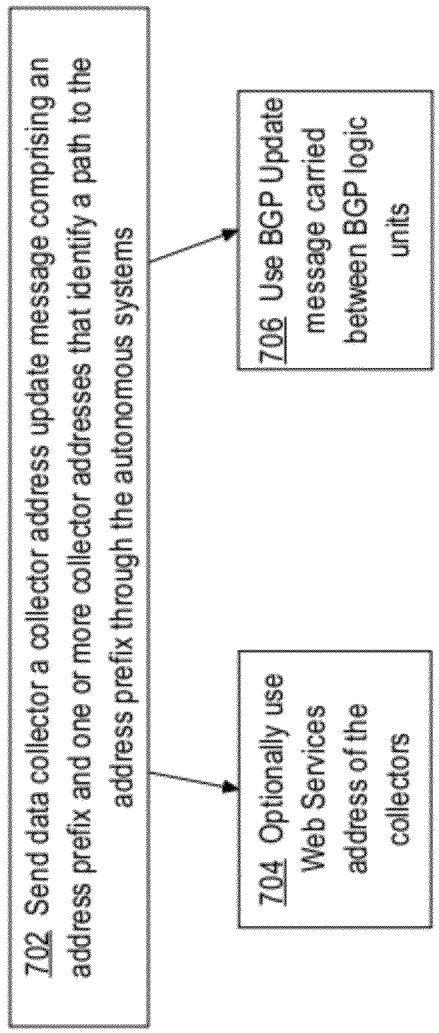
FIG. 7 illustrates sending collector address updates.

5, FIG. 6, and FIG. 7 in various embodiments. Data collector 110 may be hosted in a router as shown in FIG. 1 or may be hosted in a general-purpose computer of the type shown in FIG. 8. Data collectors 110, 111 comprise distributed collection logic 108, which enables the data collector to use certain services of BGP, such as route update messages and path messages, to perform data collection and information distribution functions as further described below.

The second router 112 in a second autonomous system 104 is coupled to the first router 106 directly or indirectly through one or more internetworks or networks that are not shown for clarity. The second autonomous system 104 may be located at a separate site or may be associated with a different network service provider than the first autonomous system 102.

Web Services logic 120 comprises one or more computer programs, other software elements, or other logic that implements services as defined in the Web Services specifications of computer hardware and software vendors and other contributors. Web Services logic 120 may implement messaging using SOAP, HTTP, HTML, XML, and related structured document formats and messaging protocols. In various embodiments, BGP and Web Services serve as alternative transport mechanisms for the messages and data that are described herein. In an embodiment, each data collector has a Web Services address, structured as a uniform resource identifier (URI) or uniform resource locator (URL) that identifies the data collector and that other data collectors address to access data that the data collector holds.

In an embodiment, web services logic 120 provides one or more wrappers for external interfaces for remote systems, such as collectors or routers, to send control messages and collect data using web services calls. Web Services logic 120 may implement collector discovery, collector parameter discovery, collector route or path queries, and collection and distribution messages. Collector discovery means that Web Services methods enable one data collector to find another data collector, which may be potentially located in another autonomous system. Collector parameter discovery means that Web Services methods enable one data collector to determine what parameter values are supported in another data collector. Collector route or path queries means that Web Services methods enable a data collector to query another data collector to determine what route or path between the two data collectors. Collection and distribution messages means that Web Services methods implement messages to request data collection, respond to requests, push data, pull data, and perform other functions as further described herein.

Each of the data collectors 110, 111 is autonomous and owned and controlled by the different autonomous system in which it resides. For example, data collector 110 does not receive or know a network address (such as an IP address) of another data collector 111 that is located in a different autonomous system. One benefit of this approach is that when the autonomous systems are owned or operated by different network service providers, it is not possible for one network service provider to specify or require when a data collector owned by another network service provider performs data collection. Instead, one data collector requests another to perform data collection using the protocol described further below, and the receiving data collector determines when and how it will provide data to the requesting data collector, and what data will be sent to the other autonomous system.

Figure 2:
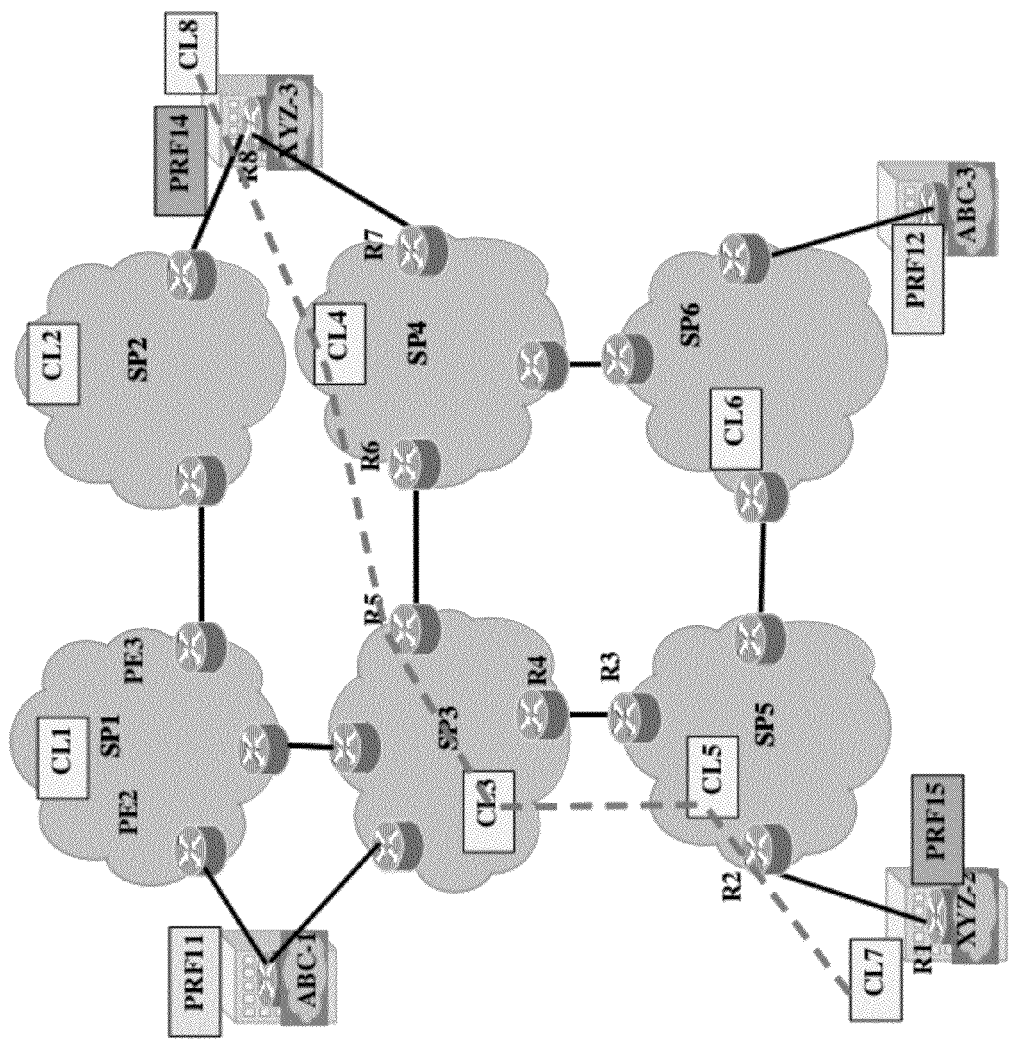
FIG. 2 illustrates an example internetwork comprising six autonomous systems with collectors, prefixes, and a path between collectors.

FIG. 2 illustrates an example internetwork comprising six autonomous systems with collectors, prefixes, and a path between collectors. Six network service providers are denoted SP1, SP2, SP3, SP4, SP5, and SP6. Each of the service providers comprises an autonomous system and each autonomous system comprises one or more routers denoted R2, R3, R4, R5, R6, R7.

Customer networks of customers of the service providers include customer edge routers that are denoted R1, R8, etc. Sites of enterprises or service provider customers are denoted ABC-1, ABC-3, XYZ-1, XYZ-2, etc. For example, ABC-1 and ABC-3 denote two different sites that are owned or operated by the same business entity, ABC. Each network that contains one of the customer edge routers has an associated prefix, which informs a neighboring node that to reach a particular customer edge router in the internet, the neighboring node needs to go through a border router belonging to the network having the associated prefix. Prefixes are denoted PRF11, PRF12, PRF14, and PRF15.

Some of the customer networks and all of the service provider networks further comprise data collectors, which are denoted CL1, CL2, CL3, CL4, CL5, CL6, CL7, CL8. Each data collector of FIG. 2 is configured as described above for collector 110, 111 of FIG. 1. The data collectors may be distributed anywhere in the autonomous systems. A particular autonomous system may have one collector or several collectors. Embodiments do not require a particular data collector to have any particular topological position within an AS.

In an embodiment, a first router R1 in a customer network identified using a prefix PRF15 comprises a collector CL7. R1 is coupled to edge router R2 of service provider network SP5, which further comprises router R3 and another router that is coupled to SP6. Service provider network SP5 comprises collector CL5, which may be hosted at any of the routers in SP5 or in another element.

Router R3 of SP5 is coupled to a router R4 in SP3, which further comprises R5, which is coupled to R6 in SP4. SP3 further comprises data collector CL3 and two other routers that are coupled to a customer network having router ABC-1 identified by PRF11 and to SP1. Service provider network SP1 further comprises provider edge routers PE2, PE3, which are respectively coupled to router ABC-1 and a router in SP2.

The service provider network SP2 comprises data collector CL2 and a router that is coupled to customer router R8, also denoted XYZ-3, which may host a data collector CL8 having prefix PRF14. Router R8 is further coupled to router R7 of service provider network SP4, which further comprises a data collector CL4, router R6, which is coupled to router R5 of SP3, and a third router that is coupled to SP6.

Service provider network SP6 comprises two other routers, one of which hosts a data collector CL6. The other router is coupled to customer router ABC-3 having prefix PRF12.

For purposes of illustrating a clear example, each of the service providers SP1, SP2, SP3, SP4, SP5, and SP6 of FIG. 2 is shown with one collector. However, a service provider may have any number of collectors. For example, a large service provider that operates a number of geographically dispersed network elements may prefer to use several regional data collectors. Further, in FIG. 2 several of the autonomous systems denoted SP1, SP2, SP3, SP4, SP5, and SP6 may be owned or operated by the same service provider. For example, all of SP5, SP3, and SP4 could be owned or operated by AT&T or another network service provider.

In this arrangement, a virtual path exists from prefix PRF15 to prefix PRF14, starting at data collector CL7 and proceeding through data collectors CL5, CL3, CL4, CL8. The virtual path is indicated in FIG. 2 by a broken line, and is used herein for explanation of a clear example; however, many other paths among data collectors may be established. Further, FIG. 2 represents only one example of a network topology that may include data collectors and use the techniques described herein; many other topologies may be used and embodiments are not limited to the arrangement of FIG. 2.

Figure 5:
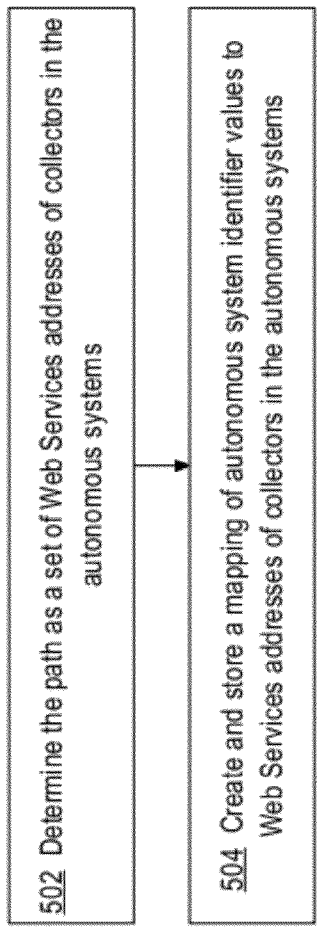
FIG. 5 illustrates mapping Web Services addresses.

FIG. 3 illustrates a process of end-to-end data collection across multiple autonomous systems; FIG. 4 illustrates processing in response to receiving a data collection message; FIG. 5 illustrates mapping Web Services addresses; FIG. 6 illustrates distributing network addresses of data collectors; FIG. 7 illustrates sending collector address updates. Referring first to FIG. 3, in an embodiment, a process of data collection across multiple autonomous systems begins at step 302 when a first data collector discovers an address prefix of a second data collector. Section 3.0 and FIG. 7 provide examples of address discovery techniques may be used.

For example, in the approach of FIG. 7, in step 702, one data collector sends a collector address update message comprising an address prefix of it or another data collector, and one or more collector addresses that identify a path to the address prefix through the autonomous systems. In an embodiment, as shown in step 706, the data collector packages the collector address update message in a BGP UPDATE message and requests BGP logic of a host router to dispatch the BGP UPDATE message. BGP logic in a receiving router updates its route table based on the collector address update information and data collector logic at the receiving router obtains the collector address update from the BGP logic using an API call or by querying the route table.

Additionally, as an option, step 702 can specify the collector addresses as Web Services addresses. The use of Web services addresses is described further in section 3.0.

Referring again to FIG. 3, in step 304, the process determines a path through a first autonomous system, and one or more internetworks if present, and a second autonomous system to the second data collector based on using a BGP route table that is accessible from the first data collector. Thus, in one embodiment, a data collector obtains BGP-related data from BGP routing tables for use in determining a path, but embodiments are not required to be implemented by piggybacking the steps or the protocol herein on BGP.

The second data collector may be located in an entirely different autonomous system than the first data collector and may be logically separated from the first data collector by any number of autonomous systems, networks or internetworks. The approaches herein permit collecting network performance data end-to-end across multiple autonomous systems and internetworks even when an endpoint involved in the data collection operation is owned or operated by an entity independent and different from the owner or operator of the requesting data collector.

Referring now to FIG. 7, in an embodiment, through step 702 a first data collector 110 (FIG. 1) receives an address prefix of a second data collector 111 in a different autonomous system. The first data collector 110 then accesses a BGP route table that the Distributed collection logic 108 manages, and determines a path through autonomous system 104 to the second data collector 111 based on BGP route table entries. In another embodiment, using the arrangement of FIG. 2, data collector CL7 receives a prefix PRF14 of data collector CL8, and the data collector CL7 then uses BGP route table data at R1 to determine a path, indicated by the broken line in FIG. 2, through multiple SP networks to CL8.

Optionally, the process can use the steps shown in FIG. 5 as part of step 304. Referring now to FIG. 5, in step 502, the path referenced in step 304 is determined as a set of Web Services addresses of data collectors in the autonomous systems. The use of Web services addresses is described further in section 3.0. In step 504, the process creates and stores a mapping of autonomous system identifier values to Web Services addresses of data collectors in the autonomous systems. Each autonomous system identifier value uniquely identifies a particular autonomous system. Using the mapping, other steps described herein can select a data collector, determine the autonomous system in which the data collector is located, and then access BGP route table data for that autonomous system in order to determine a path to the data collector.

Referring again to FIG. 3, in step 306, the second data collector is requested to provide one or more data values relating to performance of network elements of the second autonomous system. For example, as shown in step 307, the request can specify one or more of: one or more performance metrics such as number of dropped packets, total packets processed, CPU utilization, memory utilization, number of processor threads in use, etc. The request also can specify the collection data size or the amount of data that should be collected, a time interval at which to perform periodic data collection, and a number of collector "hops" at which to perform collection. The data size and time interval values operate, in certain embodiments, as threshold values that trigger a receiving data collector to send a response message with collected data when a threshold is reached.

A number N of next collector hops indicates, to a particular destination data collector, that the destination data collector should forward the request to the next (N-1) data collectors that are reachable from the destination data collector. Processing multiple hops is described further in section 3.0 and in connection with FIG. 4.

As indicated in step 309, the first data collector optionally may negotiate a set of supported performance metrics based on local policy of the receiving data collector. For example, the first data collector 110 may send a request to the second data collector 111 that includes "jitter to a prefix" as a requested performance metric, but the second data collector may be unable to report that metric because the router that hosts the second data collector does not track such information. In response, the second data collector 111 may send a message indicating that the requested metric is not supported, or providing a list of metrics that are supported. Based on the response, the first data collector 110 can repeat step 306 and issue a new request for supported metrics, or can exit the process. Using this approach, the owner or operator of an autonomous system that contains the second data collector can control what, when and how data is reported to the requesting data collector, which may be owned or operated by a competitor of the owner or operator of the second data collector.

In step 308, the requested data values are received and stored. For example, the first data collector 110 may receive one or more collected data values from the second data collector 111 relating to operation of router 112. The received values may be stored in memory of router 106, or sent to a network management system, or displayed, or sent to another system or process.

FIG. 4 illustrates steps that a data collector may perform in response to receiving a data collection request message that specifies multiple other data collector hops. In step 402, the receiving data collector receives a request message from a sending data collector, and the request message specifies a number of next collector hops greater than one. In step 404, the receiving data collector decrements the number of next collector hops by 1. In step 406, the receiving data collector forms a new request message, based on the received request message but including the decremented number of next collector hops. The receiving data collector then performs the same steps as shown in FIG. 3, step 306, 307, 308, so that the new request message is sent into the network on a path that will reach the next data collectors that are reachable from the receiving data collector.

FIG. 6 illustrates steps that a data collector may perform to advertise the existence of the data collector to other data collectors in the same autonomous system or in different autonomous systems. FIG. 6 assumes that a data collector is hosted in an apparatus, such as a network element, router, switch, or other host computer. In step 602, the process requests BGP logic to distribute a network address of the apparatus to a data collector in a BGP Path attribute of a BGP UPDATE message. For example, data collector 110 requests Distributed collection logic 108 to advertise an address of the router 106 in a BGP UPDATE message that is sent into the network using the BGP logic. As a result, other BGP nodes, such as router 112, will receive the BGP UPDATE message and learn the address of a router that has a data collector.

Optionally, as shown in step 604, the BGP UPDATE message can include a Web Services address of the apparatus, such as router 106, rather than a network address or conventional prefix. Further, as shown in step 606, in various embodiments the BGP UPDATE message can place the network address of a computer that is hosting a data collector in an Optional Transitive BGP Path attribute or an Optional Non-Transitive BGP Path attribute.

Using the approaches herein, a router, network management system, or data collector in one autonomous system is able to collect network performance data about each and every autonomous system in a path from the router, network management system, or data collector to another a router, network management system, or data collector. Thus, end-to-end performance data collection is achieved across multiple autonomous systems.

3.0 Detailed Example of Architecture, Protocol, and Operation

In an embodiment, a distributed architecture of data collectors and a data collection protocol provide for QoS performance data collection in multi-AS networks. In an embodiment, the architecture and protocol are distributed and autonomous. The protocol supports both data collection and distribution of collected data to other data collectors. In an embodiment, the data collectors are based on the Web Services (WS) framework defined by Microsoft Corporation and other industry leaders. The WS framework is widely deployed and accepted in the industry. Data collectors may provide Web Services methods for all messages that are described in this section.

In an embodiment, data collectors discover each other autonomously after initial configuration. This feature enables a particular data collector to locate any or all other data collectors located anywhere else in other autonomous systems. In an embodiment, collectors discover IP prefixes of customer autonomous systems.

In an embodiment, based on the discovery steps, a data collector computes a route, denoted herein as a Collector Path or CPath, to an IP prefix. In an embodiment, the CPath is synchronized with a BGP AS Path; that is, a CPath is the same as a BGP AS Path in a BGP table. Route computation may be performed periodically, or upon initialization of a data collector.

In an embodiment, each data collector can forward collection requests to a destination IP prefix autonomously. For example, given an IP prefix 128.0.0.0/8, a collector CL1 having CPath information (128.0.0.0/8, (CL2-CL3-CL4)) can send probe requests autonomously along CL2-CL3-CL4-128.0.0.0/8.

In an embodiment, each AS logically owns and retains full control of the one or more data collectors within that AS. One or more local data collectors perform collection in the network in which the data collector resides. A data collector of a particular AS does not need to receive or store addresses or other information about all routers that are involved in an end-to-end probe or collection operation. A data collector of a particular AS only receives or learns addresses or other information about immediate peer routers or other locally hosted data collectors. The addresses of the local peer routers are known through BGP peering.

For example, consider a topology having the following nodes and links:

CL1:R1—CL2:(R2-R3)—CL3:(R4-R5)

where CL1:R1 means R1 is in the same AS as CL1, and R1 peers with R2, which is in the same AS as CL2. In this example, CL1 does not have to know about R3, R4 or R5.

In an embodiment, a data communication protocol that supports providing end-to-end QoS data collection across multiple networks or autonomous systems may solely involve logic in the data collectors. Alternatively, some of the logic that implements the protocol may comprise BGP logic. In this alternative, an update mechanism for data collectors is incorporated into the BGP logic, and logic for performing collector path selection (or collector route computation) and other functions is incorporated within the collectors.

In the following description of a distributed multi-AS data collection framework, the following terms have the following meanings. "Framework" refers both to a logical architecture or topology of data collectors and a messaging protocol involving data collectors and BGP nodes as further described herein. The following abbreviations are used:

Collector URI/URL/WS Address—CAD
Collector AS—CAS
IP Prefix—PRF

In an embodiment, initial configuration of the framework involves manual steps, the use of a registry, or BGP operations. Each data collector may learn about the existence of other data collectors through any of several different techniques. In one embodiment, using manual steps, each data collector is configured with CAD values for each of its neighbor data collectors. The process assumes that each AS exchanges the CAD information with other autonomous systems manually. In another embodiment, when a data collector is deployed in a network and starts operating, the data collector registers with a centralized Registry System (RS). For example, WS UDDI can be used for registration. The process assumes that the autonomous systems agree in advance upon a name and location of the RS.

Using any of these mechanisms, a particular data collector can discover that a particular prefix is associated with a particular different data collector.

In an embodiment, as part of initialization the CAD of a particular data collector can be distributed opaquely by carrying the CAD in an Optional Transitive or Optional Non-transitive BGP Path attribute of a BGP Update message, which is then forwarded by the local BGP speaker to other local collectors. In an embodiment, a BGP path attribute having a CAD as the attribute value is defined for use in BGP processing. For example, a BGP path attribute named AS_PATH is defined.

Further, any of the preceding methods may be used to enable a particular data collector to learn a mapping of an AS identifier to a WS address for each other data collector that is in any of the autonomous systems. In an embodiment, each data collector obtains BGP AS paths to reachable prefixes of known or discovered data collectors by obtaining route data from BGP tables of BGP routers in the AS that hosts the local data collector. An example of a reachable prefix is "128.0.0.0/8". Each AS is then mapped to WS addresses of the collector in that AS using an agreed-upon format.

For example, in the arrangement of FIG. 2, assume that CL5 has prefix PRF10, and CL7 has discovered an association of PRF10 to CL5 using one of the discovery mechanisms described above. CL7 can query a local BGP route table and determine that PRF10 is in an AS having AS identifier 65005, and that the AS number 65005 belongs to a company (SP) called SP5. Based on this data, CL7 can map the AS number 65005 to collector WS-address http://SP5.com/SP5_Collector/. Further, a path from CL7 to PRF14/CL8 may be expressed as:
http://XYZ.com/XYZ_Collector/, http://SP5.com/SP5_Collector/,
http://SP3.com/SP3_Collector/, http://SP4.com/SP4_Collector/,
http://XYZ.com/XYZ_Collector8/.

In an embodiment, a data collector sends update messages to neighbors. Each update message comprises the following data: PRF, Sequence_of (CAD, CAS). For example, a collector data update message may comprise:

128.0.0.0/8, {(http://SP5.com/SP5123/, 65001),
(http://SP3.com/SP3333/, 65022)}.

In an embodiment, updates can be incorporated within BGP, as described below.

In an embodiment, the selection of a data collector route, or a sequence of CAD values that provides a logical path from one data collector to another, involves the following steps. First, the BGP table of a node that is hosting the data collector is checked to locate a BGP AS Path for a prefix PRF. The data collector then selects the CAD path along the AS path (shortest AS path) in the BGP table. For example, if there are three CAD paths from PRF1 to PRF2, a collector may receive updates on all these three paths. The CAD path coinciding with the BGP AS path is selected. The preceding steps are preferably performed in the data collector logic rather than in the BGP process if the update mechanism of the data collector logic is partly integrated with BGP.

In an embodiment, the data collection logic includes loop detection logic. For example, if a data collector CLx receives an update indicating CLx - - - CLy - - - CLx for the same PRF, then the data collector recognizes the update as defining a looped path, and the data collector rejects the update. In an embodiment, loop detection is performed in the data collector logic and not in the BGP process, if the update mechanism of the data collector logic is partly integrated with BGP.

In an embodiment, data probing or data collection proceeds as follows. Given a destination prefix associated with a destination data collector, a source data collector determines a sequence of CAD values, which have been learned during updates and route selection, towards the prefix. For example, referring to FIG. 2, a data collector CL5 determines that to probe 128.0.0.0/8, the data collector CL5 must go through CL3, and CL4.

Next, the source data collector (for example, CL5 in FIG. 2) probes on its own network segment (for example, R1 to R2 in FIG. 2). The source data collector then requests the next data collector (CL3) in the CAD path to perform probing, and the requested data collector (CL3) probes its own segment.

The foregoing procedure continues along the CAD path so that CL3 issues a request to CL4, etc.

In an embodiment, a border router of an autonomous system can be probed by one of the peer data collectors. Alternatively, the source data collectors in the direction of the probe can perform probing of data held at the border router.

In an embodiment, the data collection logic of each data collector is configured to support control messages including a Request message, Request-Response message, and Collect message. Other embodiments may use other messages having other names that perform similar functions, and embodiments are not limited to the use of messages that are named Request, Request-Response, and Collect. For example, the Request message or the Collect message may be denoted as a "Probe" message.

In an embodiment, the Request message indicates to a destination data collector what data to collect and how the sending data collector wants to collect performance data, and comprises a Destination value, Metrics value, an optional Cascade value, an Optional Push value, an optional Aggregate value, and a Prefix value. The Request message serves as a control setup message and one or more subsequent Collect messages actually cause collection of data.

The Destination value identifies a collector to receive the message. For example, if CL7 of FIG. 2 is the source data collector, then CL5 may be the Destination value.

The Metric value specifies a list of metrics to collect. Example metrics include throughput, number of packets, number of bytes, delay, jitter, loss, or others. Any other useful metrics may be used in other embodiments and embodiments are not limited to the metrics that are specifically identified herein. Metrics may relate to network quality of service, network events, or data collector performance, or router performance, or other characteristics. A data collector may obtain values for metrics from services such as NetFlow in Cisco IOS Software from Cisco Systems, Inc., or other services, and embodiments are not limited to collecting QoS data.

The Cascade value specifies a number of next data collector hops to which the same request should be forwarded. Thus, a data collector can cascade a probe request to a specified number of subsequent hops or other data collectors. When the Cascade value is greater than zero, then data for the specified number of hops is aggregated and reported back to the sending or source data collector together. For example, the data collector CL7 (FIG. 2) may send a Request message to CL5 that specifies Cascade 2. In response, CL5 will collect data up to CL4 and return the result data. The approach provides the benefit that CL7 does not need to individually send requests to CL3 and CL4.

The use of the Cascade value is not required. A data collector can collect performance data by sending requests to all the collectors individually on the path to a prefix. If the Cascade value is omitted, then a data collector does not perform cascading.

The optional Push value indicates that the receiving data collector should push a data response back to the sending data collector after a specified time interval that is provided with the Push value. If the Push value is not present, then the sending data collector is responsible to pull responsive data back from the receiving data collector. If the Push value is present, then the Push value also includes a Threshold value, in terms of data size or a time interval; when the Threshold value is reached, the receiving data collector automatically sends or "pushes" responsive data back to the sending data collector.

The Aggregate value is optional and, when present, includes a time interval value. The Aggregate value instructs the destination data collector to collect the requested metrics periodically according to the time interval value.

The Prefix value includes a list of destination prefixes for which data is to be collected. New prefixes can be added by sending another Request message at any time. When another Request message is sent, the destination collector adds the new prefixes to the existing list.

The Request-Response message is sent in response to a Request message and returns a list of metrics that are supported. Thus, two data collectors may exchange a series of Request and Request-Response messages to negotiate the capabilities of a receiving data collector if a sending data collector requests collection of metrics that are not available. In an embodiment, a Request-Response message comprises a list of supported metrics, a Cascade value, a Push value, an Aggregate value, and a Prefix value.

The list of supported metrics indicates what metrics are supported at the destination data collector. For example, the destination data collector can indicate that it does not support jitter measurements. The specific mechanism for indicating that a particular metric is unsupported can vary in various embodiments.

The Cascade value may be zero or a number equal to or less than the number of hops specified with a Cascade value in the request. If the Cascade value is zero, then the destination data collector is signaling that cascading is not supported. If the Cascade value is a number greater than zero, then the destination data collector is signaling the number of hops for which cascading will be performed.

The Push value may be zero or a number equal to or different than the time interval value that was specified in the request message. If the Push value is zero, then the destination data collector is signaling that push processing is not supported. If the Push value is another number greater than zero, then the destination data collector is signaling a time interval that is supported. The supported time interval may be different than the time interval specified in the request. For example, if a Request message includes a Push value with 30 minutes as the time interval, the Request-Response message could specify 60 minutes as the time interval, indicating that only the 60-minute interval will be supported.

The Aggregate value includes a number indicating a supported time interval for performing periodic data collection operations. The number indicating the supported time interval may not be the same as in the Request message.

The Prefix value includes a list of prefixes from which data will be collected. The number of prefixes in the list can be less than what was originally requested in the Request message.

The Collect message operates as a request to collect or pull data from data collectors that have already received a Request message. Thus, the Collect message is valid for pull mode only. In an embodiment, the Collect message includes a destination collector value and a prefix value. The destination collector value specifies a name of a destination data collector and the prefix identifies a prefix associated with the destination data collector. The Collect message is sent only after one or more control messages have been sent to the destination and relevant response messages have been received.

A collection example for a pull operation is now described with reference to FIG. 2. For a prefix, a source collector, such as CL7, determines a collector route towards the prefix, based on values that are learned during collector route calculation. For example, a collector CL7 determines that to probe PRF14, the collector has to go through CL5, CL3, and CL4.

CL7 then sends the following message: Collect CL5 PRF14

The destination data collector CL5 already should have collected internally any performance data between R2 and R3 and R3 and R4, which are on the path to PRF14. For example, CL5 may have collected from NetFlow on R2 and R3 or via IPSLA between R2 and R3. The exact mechanism that is used for data collection is not critical, and can be implemented differently in different AS networks.

CL7 then sends the following other messages: Collect CL3 PRF14; Collect CL4 PRF14. As a result, CL7 collects performance data end to end, from all collectors that are between CL7 and the destination prefix. CL7 is able to receive data that has been locally collected in each AS by the collectors that are resident in each AS.

A collection example for a pull operation with a Cascade value of 2 is now described with reference to FIG. 2. For a prefix, the source data collector, such as CL7, determines the collector route towards the prefix based on information learned during collector route calculation. For example, the data collector CL7 determines that to probe PRF14, the data collector has to go through CL5, CL3, and CL4. CL7 then sends the following message: Collect CL5 PRF14 Cascade 2

Since the Cascade value is specified with a value of 2, CL5 issues the messages: Collect CL3 PRF14; Collect CL4 PRF14. CL5 returns results from CL3 and CL4 to CL7.

A collection example for a push operation with a Cascade value of 2 is now described with reference to FIG. 2. Assume that the following control message has been sent from CL7 to CL5: Collect CL5 Metric delay jitter loss Cascade 2 Push 30 min Prefix PRF14.

Because the Cascade value of 2 and Push value are present, CL5 now can send the following message to CL3: Collect CL3 Metric delay jitter loss Cascade 1 Push 30 min Prefix PRF14. CL4 in turn sends to CL4: Collect CL4 Metric delay jitter loss Push 30 min Prefix PRF14.

Alternatively, depending on the capabilities of CL3 and CL4, CL5 can send to CL3 and CL4 separately: Collect CL3 Metric delay jitter loss Push 30 min Prefix PRF14; Collect CL4 Metric delay jitter loss Push 30 min Prefix PRF14

In response, data is pushed back in the chain every 30 minutes.

In an embodiment, a Collect Bulk message operates as a request for a data collector to deliver all available performance data in one response message.

The Collect message is sent when a data collector is spontaneously sending data back to the source data collector, which previously sent a Request message. For example, when a data collector reaches the data size or time interval specified in the Threshold parameter of a Request message, the data collector pushes performance data to the source.

Accordingly, a distributed data collector architecture and a message protocol have been described that provide for QoS performance data collection in multi-AS networks. The architecture and protocol provide for flexible distribution and dissemination of performance data between nodes that are located in different autonomous systems. Embodiments are useful for network service providers, business enterprises, and other entities that operate multi-AS networks.

While certain embodiments herein mention the collection of quality of service (QoS) data, other embodiments may be configured to collect any kind of data that network elements generate, maintain or manage.

One benefit of various embodiments is that manual intervention is not needed to accomplish data collection. The control messages can be scheduled once and then sent as needed, and once a data collector has received a control message and a collection request message the data collector can automatically collect and report data as needed.

4.0 Implementation Mechanisms—Hardware Overview

Figure 8:
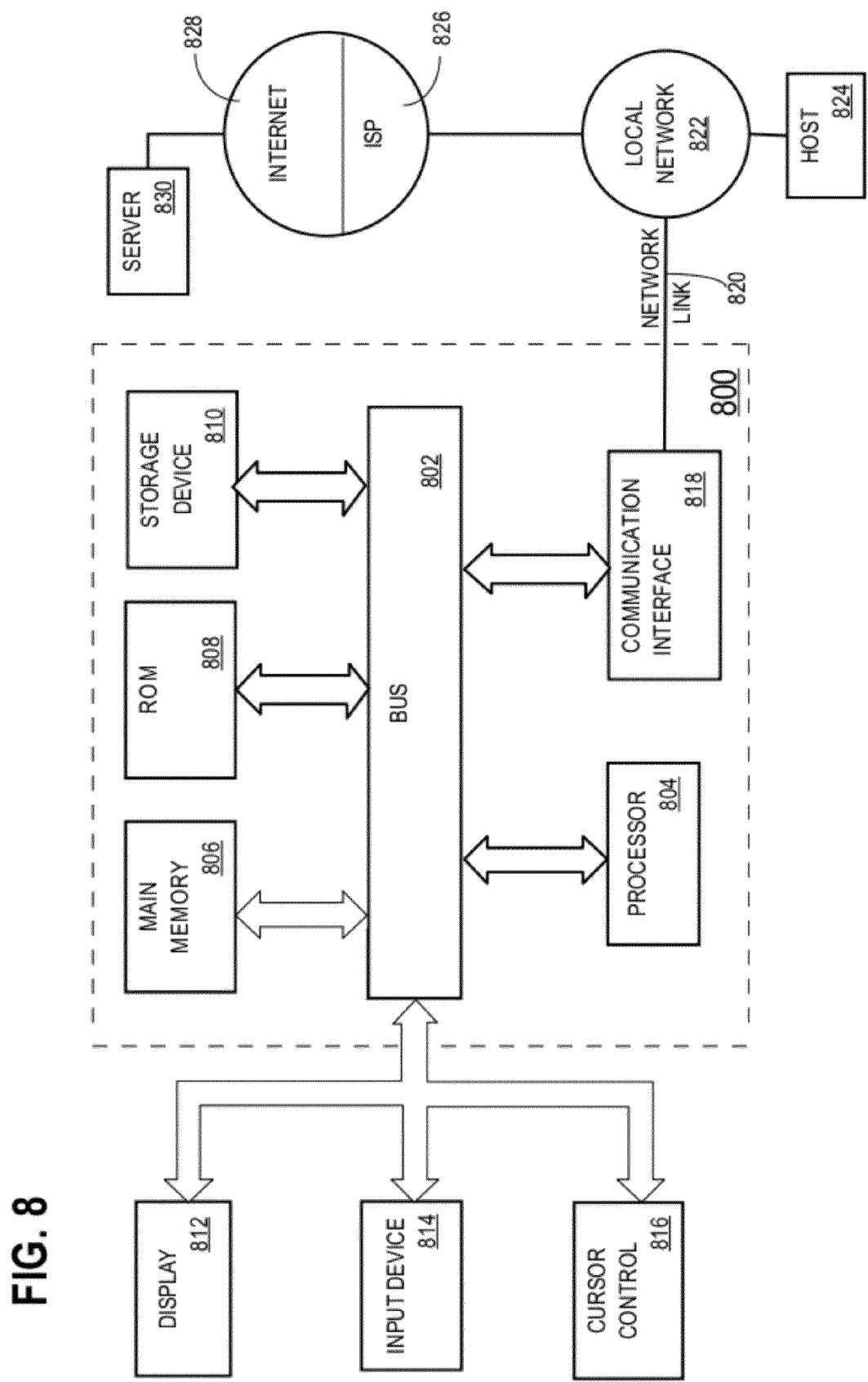
FIG. 8 illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
discovering, by a first data collector that is communicatively coupled to first Border Gateway Protocol (BGP) logic of a router within a first autonomous system, an address prefix of a second data collector that is communicatively coupled to second BGP logic of a router within a second autonomous system that is coupled to the first autonomous system directly or indirectly through one or more networks or internetworks, the second autonomous system being independent of the first autonomous system;
based on the address prefix,
determining a path through the first autonomous system, the one or more networks or internetworks, and the second autonomous system to the second data collector based on BGP route table data stored at the router within the first autonomous system;
requesting the second data collector to provide one or more data values relating to performance of network elements of the second autonomous system;
receiving and storing the one or more data values;
receiving, by the first data collector, a request to provide one or more data values relating to performance of network elements of the first autonomous system;
retrieving one or more performance data values from each of one or more local border routers within the first autonomous system.

2. The method of claim 1, further comprising sending a request message to the second data collector, wherein the request message specifies one or more of: performance metrics, a collection data size for triggering a data response message, a data collection time interval for triggering the data response message, or a number of next collector hops up to which collection shall proceed.

3. The method of claim 2, further comprising:
receiving a request message from the second data collector, wherein the request message specifies a number of next collector hops up to which collection shall proceed, wherein the number is greater than 1;
decrementing the number of next collector hops by 1;
sending the request message to a third data collector, wherein the request message specifies the decremented number of next collector hops;
receiving from the third data collector, one or more second data values relating to performance of other network elements associated with the third data collector;
receiving and storing the one or more second data values.

4. The method of claim 2, further comprising:
receiving a request message from the second data collector;
determining, based on local policy of the first data collector that not all the performance metrics are supported;
sending a response message to the second data collector identifying a sub-set of the performance metrics that the first data collector supports.

5. The method of claim 1, wherein the first data collector further comprises Web Services logic, and wherein the path comprises a set of Web Services addresses of collectors in the autonomous systems.

6. The method of claim 1, further comprising creating and storing a mapping of autonomous system identifier values, which uniquely identify the first autonomous system and the second autonomous system, to Web Services addresses of collectors within the autonomous systems.

7. The method of claim 1, further comprising requesting the first BGP logic to distribute a network address of the first data collector to the second data collector in a BGP Path attribute of a BGP UPDATE message.

8. The method of claim 7, wherein the network address is a Web Services address of the first data collector.

9. The method of claim 7, where the BGP Path attribute is any of an Optional Transitive or Optional Non-transitive BGP Path attribute.

10. The method of claim 1, further comprising sending to the second data collector a collector address update message, wherein the update message comprises an address prefix and a set of one or more collector addresses that identify a path from the first data collector to the address prefix through the autonomous systems.

11. The method of claim 10, wherein the collector address update message is carried in a BGP UPDATE message from the first BGP logic to the second BGP logic.

12. The method of claim 10, wherein the collector addresses comprise Web Services addresses.

13. The method of claim 1, further comprising registering a network address of the first data collector with a centralized Registry System.

14. The method of claim 1, wherein the one or more performance data values specify one or more of: a number of dropped packets, a total number of packets processed, central processing unit (CPU) utilization, a memory utilization, or a number of processor threads in use.

15. The method of claim 1, further comprising sending a collect bulk request message to the second data collector, wherein the collect bulk request message requests the second data collector to provide all available data values relating to performance of network elements of the second autonomous system.

* * * * *